H. I. WEST.
TONGUE SUPPORT.
APPLICATION FILED DEC. 3, 1913.
1,136,855.
Patented Apr. 20, 1915.
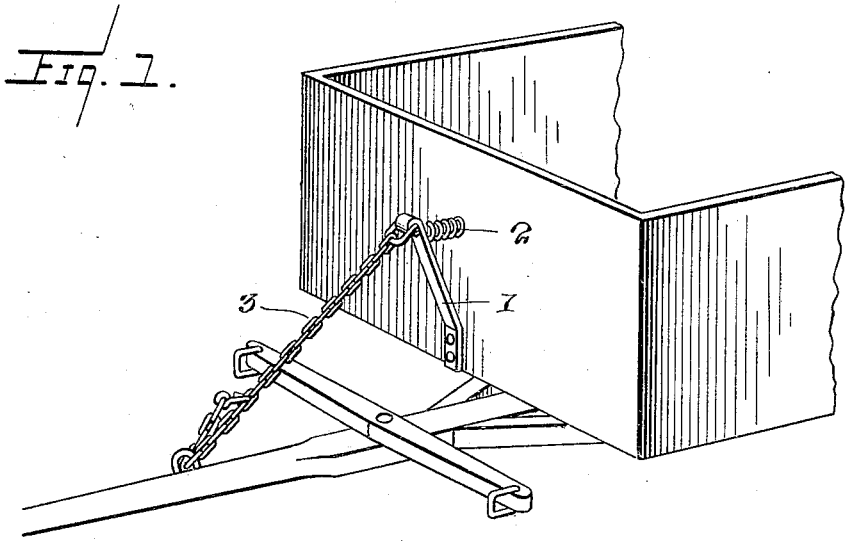
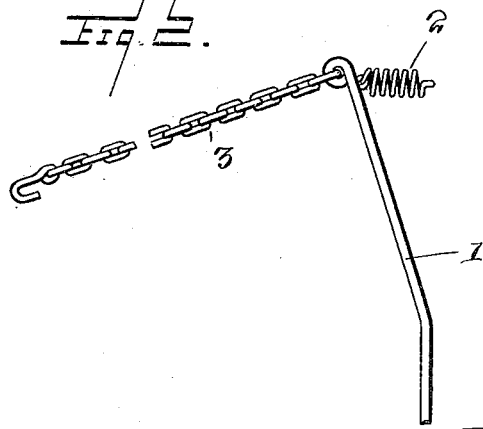
Inventor
Henry I. West
By Victor J. Evans
Attorney

UNITED STATES PATENT OFFICE.

HENRY I. WEST, OF CAVENDISH, VERMONT.

TONGUE-SUPPORT.

1,136,855.  Specification of Letters Patent.  Patented Apr. 20, 1915.

Application filed December 3, 1913. Serial No. 804,462.

*To all whom it may concern:*

Be it known that I, HENRY I. WEST, a citizen of the United States, residing at Cavendish, in the county of Windsor and State of Vermont, have invented new and useful Improvements in Tongue-Supports, of which the following is a specification.

This invention relates to tongue supports and it consists in the novel features hereinafter described and claimed.

The invention comprehends certain new and useful improvements in devices of that type for use in supporting the tongue or shafts of vehicles in order to relieve the draft animals of the weight of the same, and the invention has for its object an improved device of this character which may be readily applied to farm wagons, sleds, carriages, buggies or similar vehicles and which is arranged to yieldingly support the tongue or shafts.

With the above object in view the device includes a flexible member adapted to be attached to the body of a vehicle with its free end portion upwardly disposed. A coil spring is connected at one end with the body of the vehicle and at its other end with the said flexible member at the free end portion thereof and a chain is connected at one end with the said flexible member and at its other end with the tongue.

In the accompanying drawing:—Figure 1 is a perspective view of the device. Fig. 2 is a side elevation of the device detached.

The device includes a flexible member 1 which is adapted to be secured at its lower end portion to the forward end of the body of a wagon, sled, buggy or other vehicle. The upper end portion of the said member 1 is free to move in a forward direction with relation to the body of the vehicle but the said member is so attached to the body that it cannot move in either direction transversely thereof. A coil spring 2 is connected at one end with the body of the vehicle and at its other end is connected with the upper or free end portion of the flexible member 1. A chain 3 is connected at its rear end with the upper free end portion of the flexible member 1 and the forward end of the said chain is passed through a staple mounted upon the tongue and the end hook of the chain is engaged with one of the intermediate links, whereby the tongue is adjustably supported.

When the device is used upon a buggy the elements as above described are used in duplicate sets one set being placed at one side of the dash board or front part of the buggy body and the other set at the opposite side thereof. The chains 3 in this case are connected with the shafts of the vehicle at a point between the ends of the shafts.

From the foregoing description in connection with the accompanying drawing it will be seen that the supports will hold the tongue or shafts up and thus the draft animal or animals are relieved of the weight of the same upon their necks or shoulders.

Having described the invention what is claimed is:—

In combination with a vehicle body having a draft member pivotally connected therewith, a support comprising a flexible member secured at one end to the body and being free at its other end to move in a forward direction with relation to the body, a chain connected at one end with the upper free end portion of said flexible member and at its other end with the said draft member and a spring connected at one end with the body and at its other end with the upper free end portion of the said flexible member.

In testimony whereof I affix my signature in presence of two witnesses.

HENRY I. WEST.

Witnesses:
EDUARD F. BUTLER,
FRED H. SMITH.

Copies of this patent may be obtained for five cents each, by addressing the "Commissioner of Patents, Washington, D. C."